H. E. RIEHL.
CAR FOR PLEASURE RAILWAYS.
APPLICATION FILED OCT. 7, 1921.
1,404,143.
Patented Jan. 17, 1922.
3 SHEETS—SHEET 1.
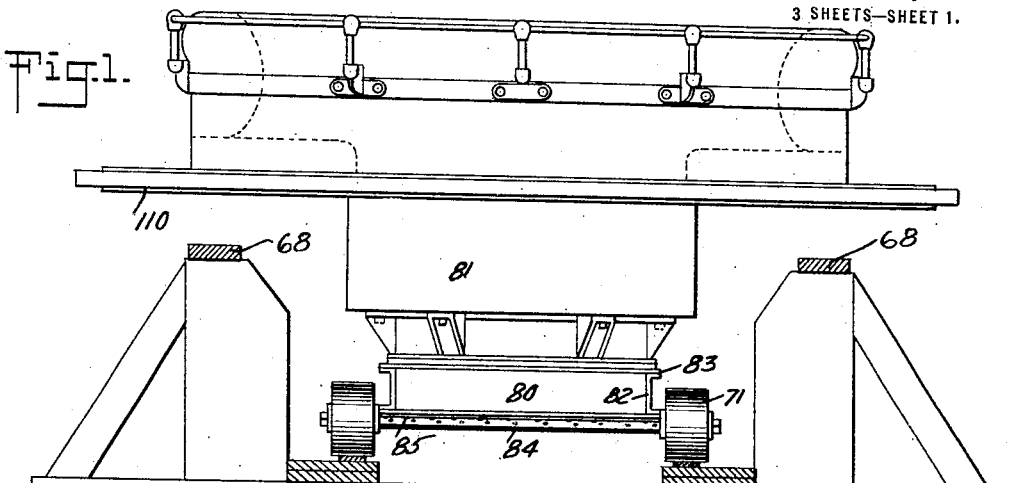
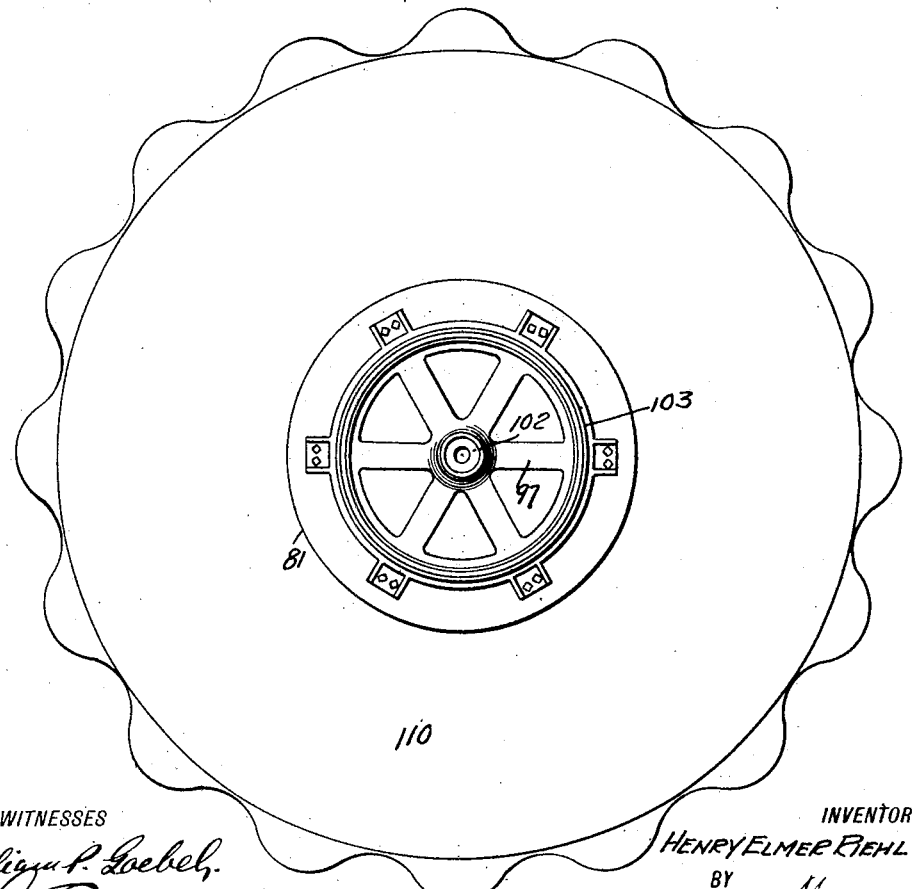
WITNESSES
INVENTOR
HENRY ELMER RIEHL
BY
ATTORNEYS

H. E. RIEHL.
CAR FOR PLEASURE RAILWAYS.
APPLICATION FILED OCT. 7, 1921.

1,404,143.

Patented Jan. 17, 1922.

WITNESSES

INVENTOR
HENRY ELMER RIEHL
BY
ATTORNEYS

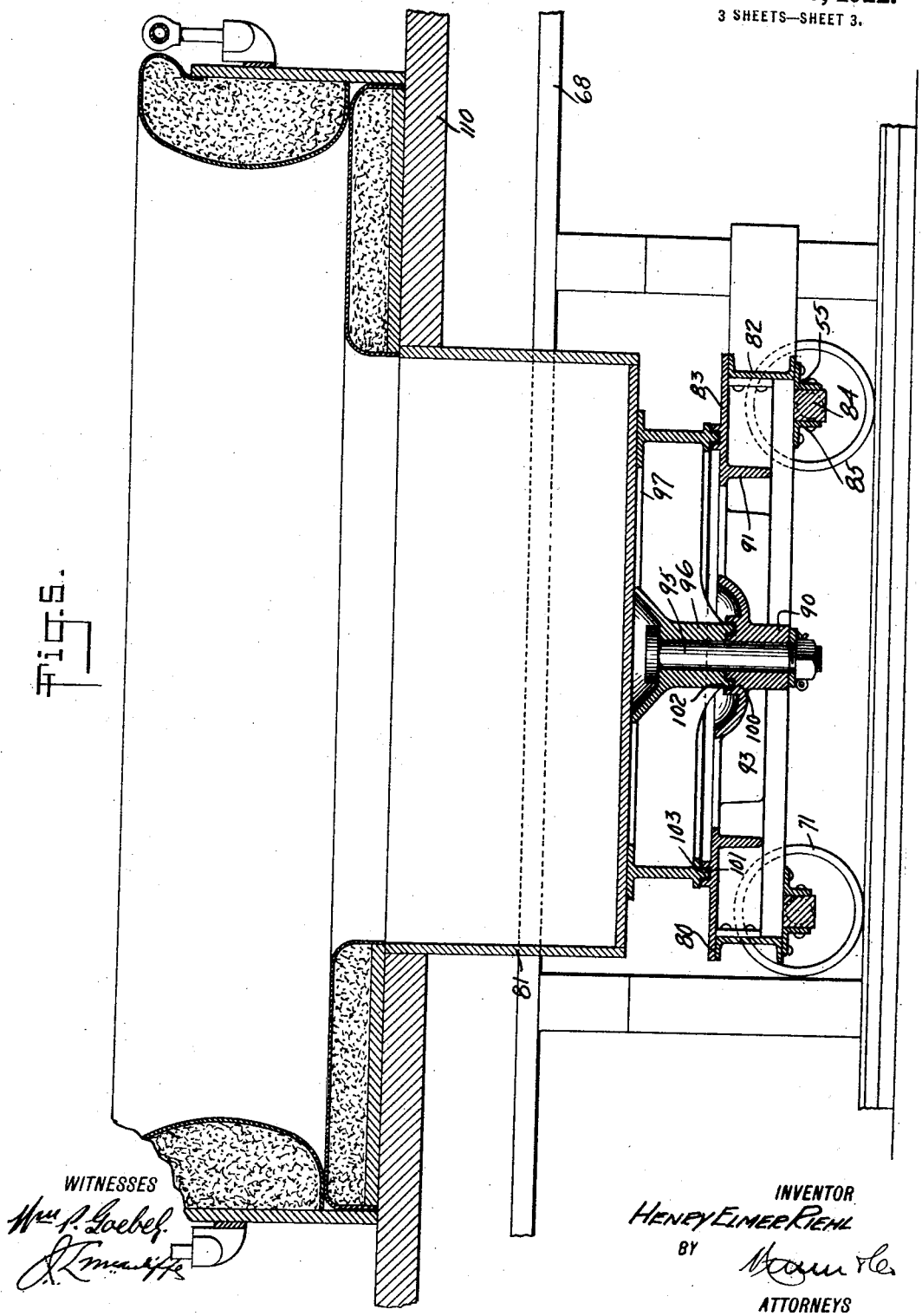

UNITED STATES PATENT OFFICE.

HENRY ELMER RIEHL, OF BROOKLYN, NEW YORK.

CAR FOR PLEASURE RAILWAYS.

1,404,143.               Specification of Letters Patent.    Patented Jan. 17, 1922.

Original application filed July 28, 1921, Serial No. 488,096. Divided and this application filed October 7, 1921. Serial No. 506,061.

*To all whom it may concern:*

Be it known that I, HENRY ELMER RIEHL, a citizen of the United States, and a resident of the city of New York, borough of Brooklyn, in the county of Kings and State of New York, have invented a new and Improved Car for Pleasure Railways, of which the following is a description.

My invention relates to an amusement apparatus for use in pleasure resorts, parks, exhibition grounds, and the like, and more particularly is designed as an improvement on the pleasure railway forming the subject matter of United States Letters Patent granted to me November 26, 1907, Number 872,253.

The present application is a division of an application filed by me July 28, 1921, Serial Number 488,096.

The invention of the present application resides in a novel car, the distinctive features and advantages of which will clearly appear as the description proceeds.

Reference is to be had to the accompanying drawings forming a part of this specification, it being understood that the drawings are merely illustrative of one example of the invention.

Figure 1 is an end elevation of a car embodying my invention;

Figure 2 is an inverted plan view of the car removed from the truck;

Figure 5 is an enlarged longitudinal vertical section through the truck and car body.

Figure 3:
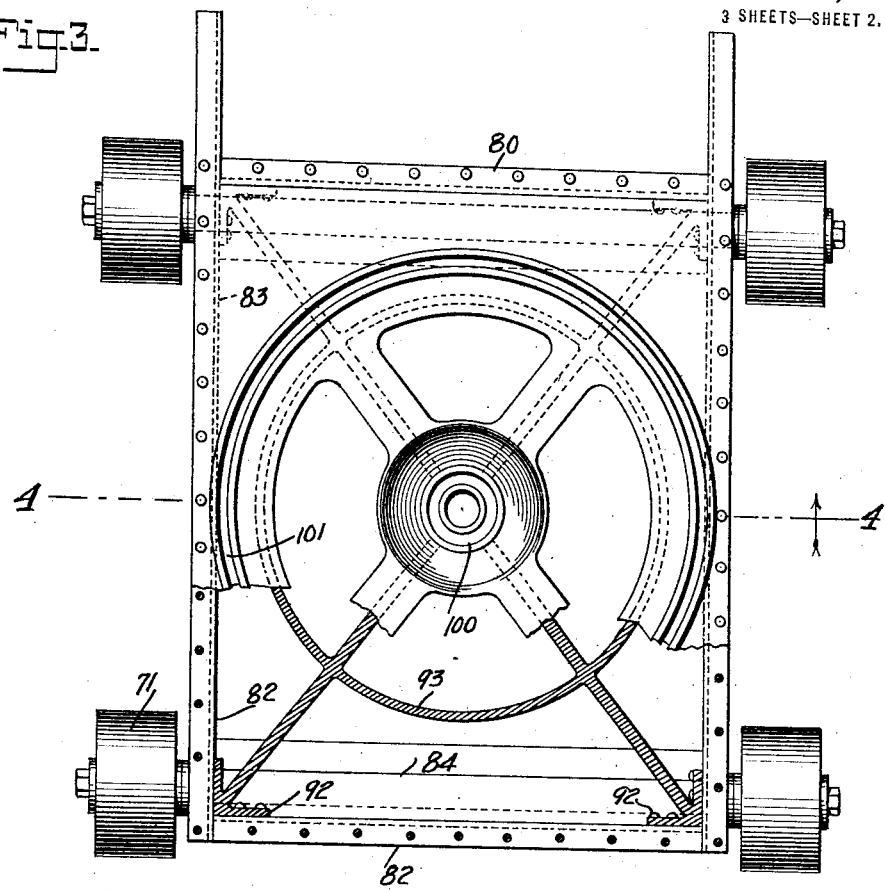
Figure 3 is an enlarged plan view of the truck with the parts shown in section.
Figure 4:
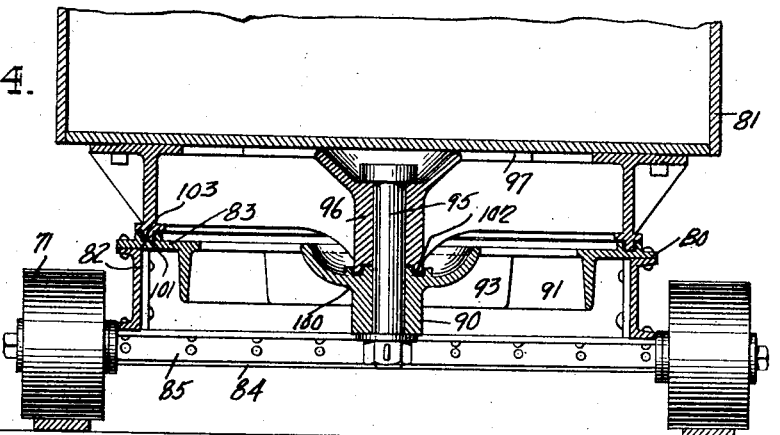
Figure 4 is a transverse vertical section of the truck and the lower portion of the car body, the section being taken in a plane corresponding with the line 4—4, Figure 3.

My improved car includes a car truck 80 and a car body 81 mounted to rotate on the car truck 80. The car truck 80 is provided with a truck frame, preferably made of channel irons 82 on which is bolted or riveted a top plate 83 to give the desired rigidity to the truck frame. The car wheels 71 are journaled in the illustrated example on the ends of square axles 84 abutting against the under side of the side channel irons 82 of the truck frame, and the said axles are fastened by angle irons 85 to the channel irons, thus securely holding the axles in place on the truck frame at the same time reinforcing the latter by the axles. The plate 83 of the truck frame is provided with an integral centrally disposed hub 90 provided with diagonal ribs 91 terminating in angular brackets 92 riveted, bolted, or otherwise fastened to the channel irons 82 at the inner faces thereof, as will be readily understood by reference to Figure 3. An annular rib 93 connects the diagonal ribs 91 with each other to reinforce the plate 83. The hub 90 is engaged by a vertically disposed pivot pin or king bolt 95 held in a hub 96 forming part of the bottom 97 of the car body 81 to allow the car body to turn on the truck frame 80. The top plate 83 of the truck frame 80 is provided at the hub 90 with an annular groove 100 and a similar annular groove 101 is formed in the upper face of the top plate 83 and is arranged concentric with the annular groove 100, and the center of the said concentric grooves 100 and 101 is arranged to coincide with the axis of the pivot 95. The grooves 100 and 101 are engaged by annular tongues 102 and 103 of which the tongue 102 is formed on the bottom of the hub 96 while the tongue 103 is formed on the outer portion of the bottom 97. It will be noticed that by this arrangement the car body 81 is free to rotate on the car truck 80 and at the same time the desired stability is given to the car body 81 particularly should the same be unevenly filled with passengers to prevent rocking of the car body owing to the tongue and groove connection 100, 101, 102 and 103.

The car body 81 of the car 80 is preferably of cylindrical shape and it is provided with an annular guard 110 which is disposed continuously about the car body 81 at the exterior and projects laterally outward sufficiently to be disposed above the longitudinal elevated beams 68 of the track structure, the arrangement being such that in case the truck 80 should become accidentally disconnected from the car body, the said guard 110 can drop onto the said beams 68 and slide along the latter without endangering in any way the lives of any passengers that may be in the car at the time. With the car body resting on the beams 68 of the slide the car body may travel along said slide following all curves and inclinations of the latter and in this traveling movement of the car body, the area of the guard 110 and its support at both sides of the track prevents tilting of the car body to a degree that would result in its displacement from the slide afforded by the beams 68.

I would state in conclusion that while the illustrated example constitutes a practical embodiment of my invention, I do not limit myself strictly to the mechanical details herein illustrated, since, manifestly, the same can be considerably varied without departure from the spirit of the invention as defined in the appended claims.

Having thus described my invention, I claim:

1. In a pleasure railway, a car comprising a truck, a car body, a pivot pin connecting the said car body with the said truck to allow the car to turn on the truck, the said truck and car body having annular concentric grooves and tongues one engaging the other, the center of the grooves and tongues coinciding with the axis of the said pivot pin.

2. In a pleasure railway, a car comprising a truck, and a car body, the said truck having a channel iron frame, a plate attached to the top thereof and provided with a central hub and axles rigidly attached to the under side of the said truck frame and provided with car wheels, the said car body having its bottom provided with a central hub and a pivot pin engaging the said hubs to allow the car body to turn on the car truck.

3. In a pleasure railway, a car comprising a truck and a car body, the said truck having a channel iron frame, a plate attached to the top thereof and provided with a central hub and axles rigidly attached to the under side of the said truck frame and provided with car wheels, the said car body having its bottom provided with a central hub and a pivot pin engaging the said hubs to allow the car body to turn on the car truck, the said plate having concentric grooves, of which one is on the plate hub, and the said car body bottom having concentric ribs engaging the said grooves.

4. In a pleasure railway, a car comprising a truck and a car body, the said truck having a channel iron frame, a plate attached to the top thereof and provided with a central hub and axles rigidly attached to the under side of the said truck frame and provided with car wheels, the said car body having its bottom provided with a central hub and a pivot pin engaging the said hubs to allow the car body to turn on the car truck, the said plate having concentric grooves, of which one is on the plate hub and the said car body bottom having concentric ribs engaging the said grooves, the inner rib being formed on the hub of the said bottom.

5. In a pleasure railway employing an elevated track structure, a wheeled truck and a car body turnably supported on the truck between the wheels thereof and having a guard flange disposed continuously about the body at the exterior surface thereof and extending laterally outward materially beyond the plane of the body to thereby be positioned to drop to the sides of the track structure in the event the truck and body separate.

HENRY ELMER RIEHL.